April 22, 1958  R. N. FALGE ET AL  2,831,262
PROJECTION LAMP AIMING DEVICE
Filed Sept. 1, 1955  3 Sheets-Sheet 1

INVENTORS
Robert N. Falge &
BY Earl M. Brohl
E. W. Christen
ATTORNEY

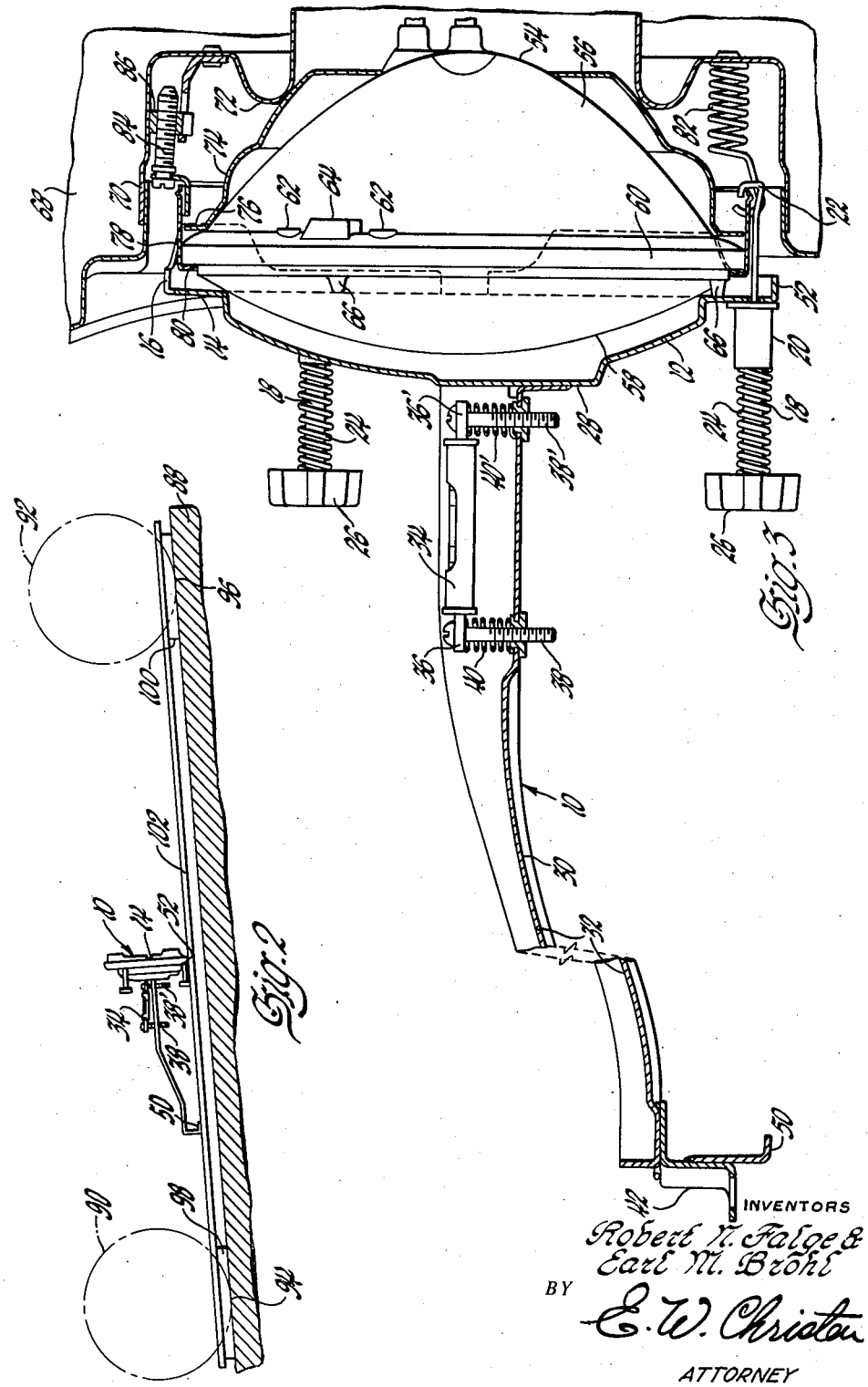

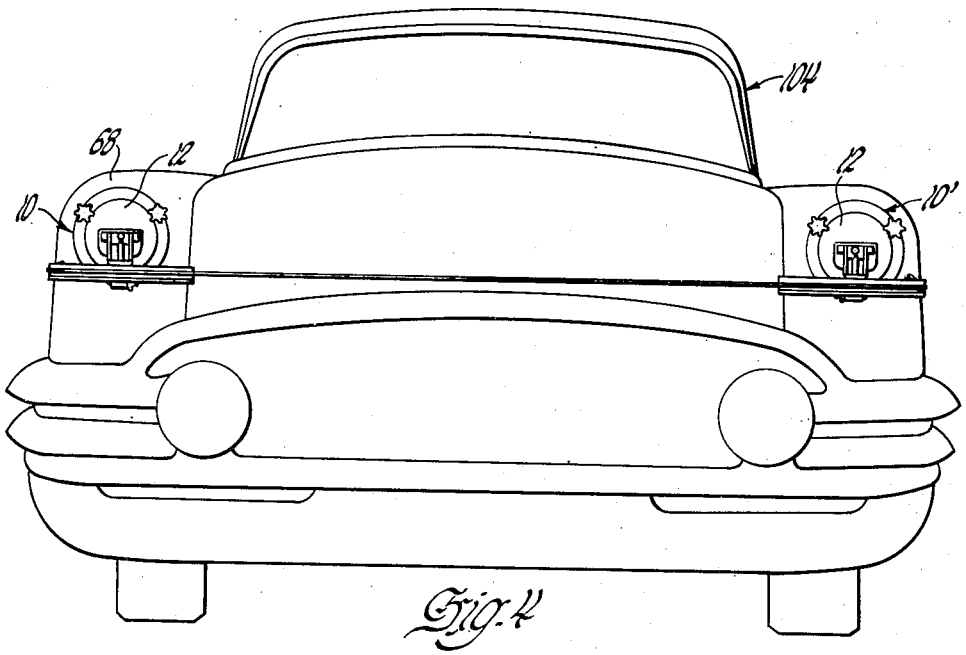
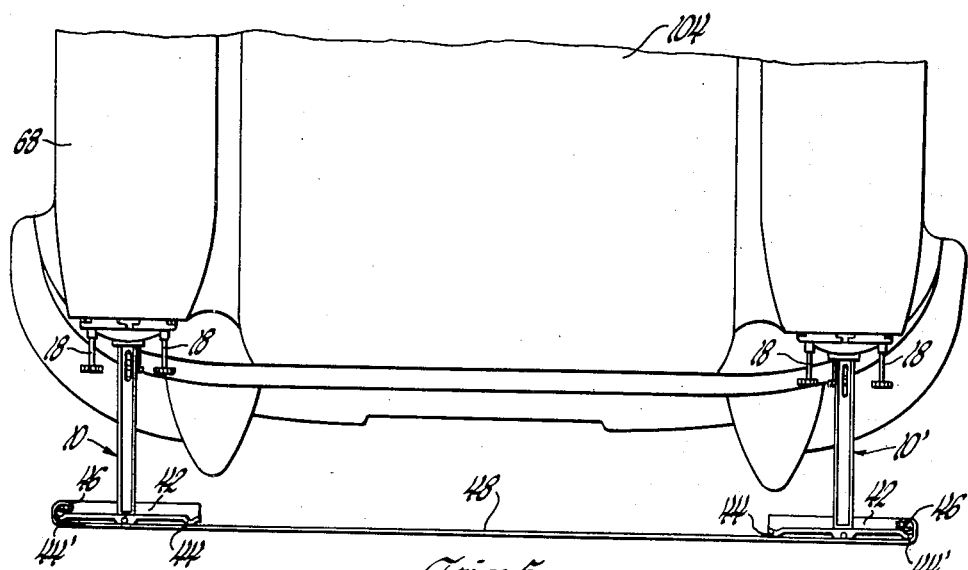

United States Patent Office 2,831,262
Patented Apr. 22, 1958

2,831,262

PROJECTION LAMP AIMING DEVICE

Robert N. Falge, Anderson, Ind., and Earl M. Brohl, Flint, Mich., assignors to General Motors Corporation, Detroit, Mich., a corporation of Delaware Application September 1, 1955, Serial No. 532,079

6 Claims. (Cl. 33—180)

This invention relates to aiming of projection lamps and more particularly to an improved instrument for use in aiming the light beam projected from such lamps. The invention is especially adapted for use in aiming vehicle headlamps of the type having an aiming surface in a predetermined angular relation with the projected light beam direction. Lamps of this type are known, and are referred to herein, as pre-aimed lamps. A pre-aimed lamp, especially suitable for a vehicle headlamp, is disclosed and claimed in U. S. application Serial No. 515,684, filed by Charles F. Arnold and Edward N. Cole on June 15, 1955 and assigned to the assignee of the present invention.

The proper aim of vehicle headlamps is, of course, of great importance to the effective and safe operation of an automobile vehicle. Ho provide adequate roadway illumination it is necessary to employ lamps of high candlepower with accurately controlled light distribution and directivity. In general, the desired result is to provide illumination of the roadway sufficiently far in advance of the vehicle to permit adjustment of the vehicle operation in accordance with the roadway conditions while controlling the light beam direction in such manner that the operator of an oncoming vehicle is not blinded.

In the aiming of vehicle headlamps, whether effected by means of optical or geometrical instruments or a combination of both, it is a practice to direct the light beam from each of the headlamps at a predetermined angle with respect to the straight-ahead direction or longitudinal axis of the vehicle. The headlamps may be aimed, for example, on the upper beam with the most intense portion thereof directed straight ahead and slightly downward. This directivity of the light beam may be defined in terms of angular deflection in the horizontal and vertical planes when the vehicle is in a level attitude such as that assumed when parked on a level surface. In the ordinary, commercially produced vehicle headlamp there is a random angular deviation between the direction of the light beam projected from the lamp and the mounting rim or seating surface of the lamp. This angular deviation occurs because of inaccuracies in filament position or the relative location of other parts of the optical system. Precision aiming of the vehicle lamps cannot be achieved without taking into account both of the aforementioned deflection and deviation angles. The prior art aiming instruments which can be employed to take these factors into account may be characterized as being unduly complicated, requiring a skilled operator, and not adapted for use with the pre-aimed type of lamp.

It is an object of this invention to provide an improved aiming instrument for lamps which is accurate in operation, simply and rugged in construction and inexpensive to manufacture.

It is a further object of this invention to provide an aiming instrument which requires a minimum of parts and adjustment, and may be used by an unskilled operator to obtain precise aiming of a projection lamp.

A further object is to provide a geometrical aiming device which is effective to establish the directivity of the light beam projected from the lamp with optical precision.

An additional object is to provide an aiming instrument for vehicle headlamps which may be used for ascertaining the inclination of the vehicle during the aiming operation to establish a datum indication for the indicating means on the aiming instrument.

In the attainment of these and other objects, there is provided a support member including a seating surface adapted to be attached to the lamp for movement therewith. An aiming element is provided on the support member and includes level indicating means for establishing aim in the vertical plane. Another aiming element is disposed on the support member and extends at a predetermined angle with respect to the seating surface for alignment with reference means to establish aim in the horizontal plane. The support member is provided with elements adapted to provide support for the instrument on an inclined surface to obtain a datum indication for the level indicating means.

A more complete understanding of the invention may be had from the detailed description which follows, taken with the accompanying drawings in which:

Figure 2 illustrates the manner in which the aiming instrument is used to obtain a datum indication.

Figure 3 is a side elevation view of the instrument attached to a vehicle headlamp.

Figure 4 is a front view of a pair of the aiming instruments installed on the headlamps of a vehicle.

Figure 5 is a plan view of the installation shown in Figure 4.

Figure 1:
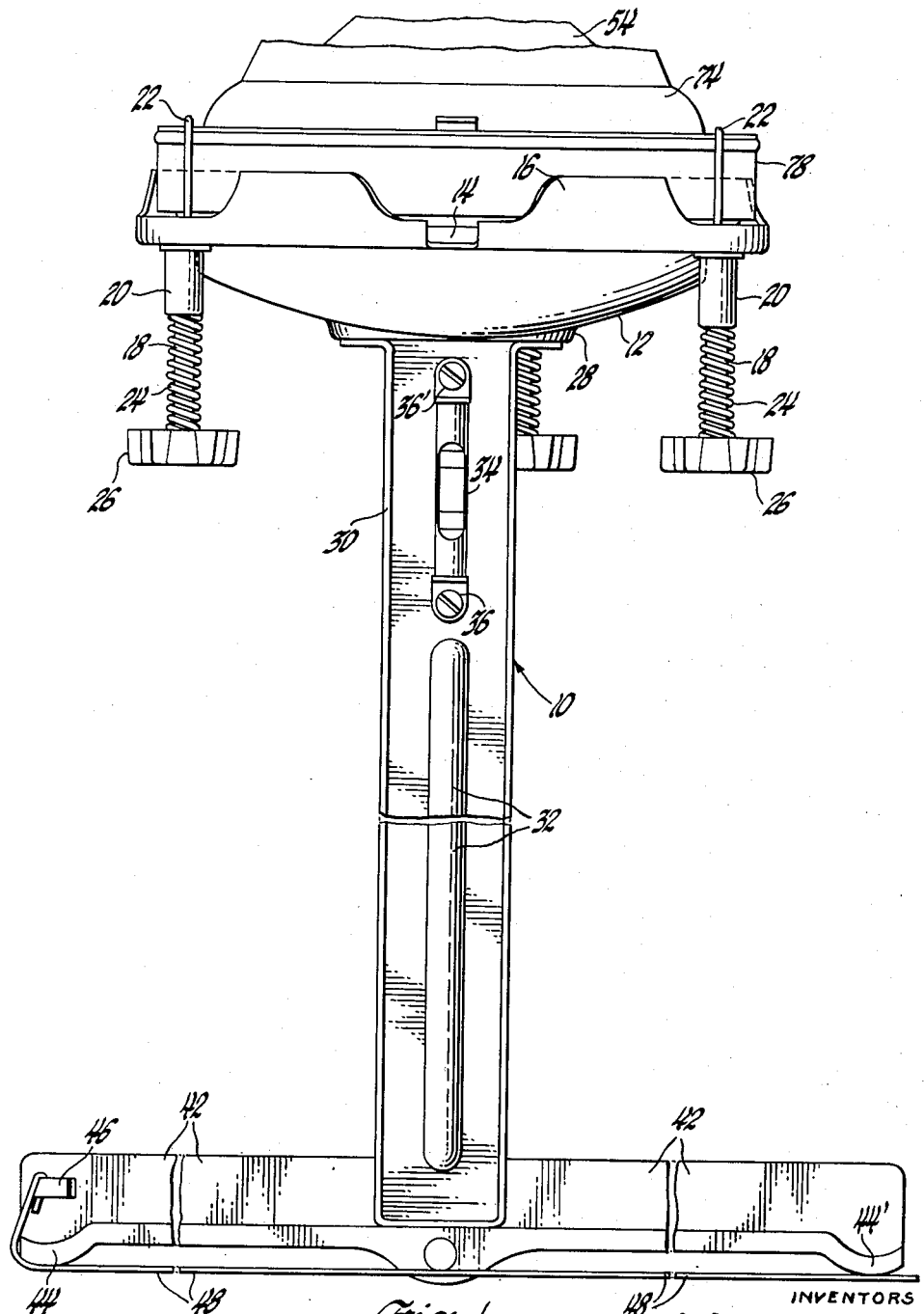
Figure 1 is a plan view of the inventive aiming instrument.

The drawings represent an illustrative embodiment of the invention in an aiming instrument especially adapted for use in aiming vehicle headlamps of the pre-aimed type. Referring now to Figures 1 and 3, the aiming instrument, designated generally at 10, comprises a support member 12 of metal construction and preferably of circular cup-shaped configuration. The support member 12 is provided with an annular seating surface 14 disposed adjacent the periphery which terminates in a flange portion 16. To provide for attachment of the support member to the lamp for use there is provided a plurality of securing means or plungers 18 extending through circumferentially spaced bosses 20 disposed near the periphery of the support member 12. The plungers 18 terminate in hook portions 22 adapted to engage mounting structure for the lamp, to be described subsequently. A coil spring 24, coaxial with each of the plungers 18, is interposed between the boss 20 and an operating handle 26 of the plunger 18 to resiliently urge the hook 22 toward a retracted position.

The support member 12 is provided with a central boss 28 upon which is rigidly mounted a first aiming element or arm 30. The arm 30 extends outwardly from the support member 12 at a predetermined angle, preferably perpendicular, to the plane of the seating surface 14. The arm 30 is suitably of metal construction of channel-shaped configuration and may be provided with a reinforcing rib 32 to enhance the rigidity of the structure. Mounted upon the arm 30 is a level indicating device such as spirit level 34 provided with spaced mounting lugs 36 and 36'. The mounting lugs 36 and 36' are connected with the arm 30 by a pair of adjusting screws 38 and 38' extending through coil springs 40 and 40', respectively. This construction provides a resilient support for the spirit level 34 and facilitates adjustment of the inclination thereof with respect to the arm 30 and hence, seating surface 14.

A second aiming element or cross bar 42 is rigidly connected to the arm 30 and extends transversely thereof at a predetermined angle, preferably parallel, to the seating surface 14. The cross bar 42 also may be of metal construction and is provided with a pair of forwardly extending protrusions 44 and 44'. Adjacent the protrusion 44 the cross bar 42 is provided with a suitable anchoring device or lug 46 to accommodate the connection of a flexible cord 48.

The instrument 10 is provided with a support element or foot 50 which depends from the cross bar 42 and a support element 52 which is constituted by the lowermost portion of the flange 16. It is noted that the support elements 50 and 52 terminate in a plane which is disposed in a known angular relationship, preferably perpendicular, to the seating surface 14. This arrangement of the support elements 50 and 52 affords stable support for the aiming instrument 10 when disposed on a plane surface and the seating surface will assume a known disposition with respect to the plane surface. The advantages of this construction will become apparent consequently.

As shown in Figures 1 and 3, the aiming instrument 10 is adapted for attachment to a vehicle headlamp 54. The headlamp 54, in the illustration embodiment, is of the well known all glass sealed beam construction and is provided with pre-aiming structure set forth in the above mentioned application. The lamp 54 comprises a reflector 56 and a lens 58, integrally joined by fusion at a peripheral flange or rim 60, enclosing a filamentary light source (not shown). The rim 60 is provided with the usual seating surfaces 62, and orienting lugs 64. Disposed circumferentially adjacent the periphery of the lens 58 are a plurality of aiming projections 66 which define an aiming plane on the lamp having a known angular position with respect to the direction of the light beam projected from the lamp. The aiming plane defined by the projections 66 is preferably inclined with respect to the direction of the light beam to incorporated the desired horizontal and vertical deflection or aiming angles. Thus in the preferred embodiment the aiming plane accounts for both the aforementioned deviation and deflection angles.

The lamp 54 is dirigibly mounted in the vehicle body 68 which supports a housing member 70 terminating in an annular socket 72. A casing member 74 is provided with a seating flange 76 having suitably oriented recesses for coaction with the orienting lugs 64 on the lamp, and is seated in the socket portion 72. A retaining ring 78 is provided with a flange 80 engaging the rim 60 of the lamp 54. The retaining ring 78 is secured to the casing 70 by interposed tension spring 82 and adjusting screw 84. The adjusting screw 84 may be advanced or retracted in a threaded lug 86 to impart angular motion to the lamp 54 in the vertical plane. Similar adjusting structure (not shown) is provided for imparting angular motion to the lamp 54 in the horizontal plane.

Before proceeding with the aiming operation, the operation of the instrument for ascertaining the datum indication for the level indicating device will be described. In aiming a headlamp of the pre-aimed type it is necessary to adjust the aiming plane thereof to a position in which it is in a predetermined angular relation to the longitudinal axis or straight-ahead direction of the vehicle. In a pre-aimed lamp in which the aiming plane is inclined with respect to the direction of the light beam to incorporate the desired horizontal and vertical deflection or aim angles, it is merely necessary to adjust the angular position of the lamp so that the aiming plane is perpendicular to the vehicle axis. Since this axis is not readily identifiable on the vehicle structure, it is desirable to locate the axis with reference to portions of the vehicle structure and a horizontal plane. The headlamps of a conventional vehicle are disposed symmetrically about the vehicle axis and corresponding points on the two headlamps or associated mounting structure lie on a line which is perpendicular to the axis of the vehicle. This line may serve as a convenient reference for obtaining the desired aim in the horizontal plane. With the vehicle disposed on a plane support surface the vehicle assumes an attitude in which its longitudinal axis is substantially parallel to the support surface. If the plane support surface is level or lies in a horizontal plane the vehicle axis also lies in a horizontal plane. Thus aiming in the vertical plane may be accomplished by reference to a level indicating means such as a spirit level or plumb bob. However, it is often necessary or desirable to perform an aiming operation on vehicle headlamps with the vehicle supported on an inclined surface. In many service stations, for example, space is not available to provide a level surface suitable for headlamp aiming. It is, of course, desirable to be able to perform the aiming operation on the driveway of gasoline stations and garages, to promote safe vehicle operation by widespread adoption of headlamp aiming.

The manner in which the aiming instrument is adjusted to adapt it for an aiming operation with the vehicle on an inclined surface will be explained with reference to the diagrammatic illustration of Figure 2. The surface or floor 88 upon which the vehicle is to be parked is shown to be inclined at an exaggerated angle for explanatory purposes. The vehicle front and rear wheels, represented by phantom lines 90 and 92 are to be located at the spaced points 94 and 96. At the points 94 and 96 suitable blocks 98 and 100, respectively, are positioned to support a beam 102 of sufficient rigidity to support its own weight and that of the instrument 10 without deflection. The blocks 98 and 100 are of equal thickness and therefore the beam 102 assumes the slope or inclination of a straight line connecting the spaced points. The aiming instrument 10 is positioned on the beam 102 in the attitude shown and supported by the spaced support elements 50 and 52. In this position the seating surface 14 is perpendicular to the surface of the beam 102. The level indicating device 34 is then adjusted by means of the adjusting screws 38 and 38' to obtain a datum indication, preferably with the indicator bubble of the spirit level centered. The level indicating means is thus pre-set for use of the aiming instrument on vehicles parked on the inclined surface 88. In performing the aiming operation, the aim of a lamp in the vertical plane will be established by adjusting the angular position of the lamp until the indicating bubble of the spirit level assumes the datum indication. In this condition, the seating surface 14 and the aiming plane of the lamp will be disposed in a plane perpendicular to the floor 88 and hence the straight-ahead direction of the vehicle.

The performance of the aiming operation will be described with reference to Figures 4 and 5. The vehicle 104 is parked on the drive 88, as previously described, and the aiming instrument 10 is attached to one of the vehicle headlamps and an identical aiming instrument 10' is attached to the other of the vehicle headlamps. This attachment, as shown in Figures 3 and 4, is accomplished by removing the headlamp trim panel or door (not shown) from the body portion 68 surrounding the headlamp. The retaining ring 78 is thereby exposed and the support member 12 is positioned over the lens of the lamp with the seating surface 14 in close engagement with the aiming projections 66. In this position the plungers 18 are advanced against the resistance of the coil springs 24 and manipulated to engage the hook 22 over the edge of the retaining ring.

To effect the aim in the horizontal plane the cord 48 is drawn taut between the anchor lugs 46 on the cross bars 42 of the two instruments 10 and 10'. The adjusting screws (not shown) of each lamp for rotating the lamp in the horizontal plane are advanced or retracted until the cord 48 is disposed tangent to the protrusions 44 and 44' on each of the aiming devices 10 and 10'. When this condition is realized the aiming plane defined by aiming projections 66 is perpendicular in the horizontal plane to the longitudinal axis or straight-ahead direction of the vehicle and the horizontal aiming is completed.

To effect the aim in the vertical plane for each lamp, the adjusting screw 84 for rotation of the lamp in the vertical plane is advanced or retracted until the level indicating device 34 indicates the pre-set datum value. In this condition the aiming plane of each lamp is perpendicular, in the vertical plane, to the longitudinal or straight-ahead direction of the vehicle. This completes the aim in the vertical plane. The attainment of the desired positioning of the lamp aiming planes by the aiming instrument ensures that the light beam is directed with great accuracy. It will be appreciated that the desired horizontal and vertical aim angles may be incorporated in the inclination of the aiming plate, as described, or may be incorporated in the structure of the aiming instrument. In either case the operation is the same.

Although the invention has been described with respect to a particular embodiment, such description is not to be construed in a limiting sense. Many variations and modifications within the spirit and scope of the invention will now occur to those skilled in the art. For a definition of the invention reference is made to the appended claims.

We claim:

1. An instrument for aiming the light beam of a vehicle headlamp of the type having an aiming surface disposed in known relation to the light beam direction comprising a support member having a seating surface thereon adapted to engage said aiming surface, means for securing the support member to a headlamp installed in a vehicle, a first member connected to the support member and extending at a predetermined angle with respect to said seating surface in one plane, a second member rigidly connected to the first member and extending transversely thereof at a predetermined angle with respect to said seating surface in a transverse plane, level indicating means, and an adjusting mechanism including resilient resisting means interconnecting the level indicating means and the first member for presetting the indicating means to a datum value.

2. An instrument for aiming a dirigible, vehicle mounted lamp in the horizontal and vertical planes, comprising a support member including a seating portion, means for attaching the support member to the lamp with the seating surface in fixed relation with the lamp for movement therewith, a transversely extending part on the support member for alignment with reference means for aiming in the horizontal plane, plural spaced support parts on the support member disposed in a plane having a predetermined angular relation to said seating portion, said support parts being adapted to provide stable support for the support member upon a substantially plane, inclined surface, and level indicating means adjustably mounted on the support member for establishing aim in the vertical plane, said level indicating means being presettable to a datum indication to compensate for inclination of the vehicle during aiming.

3. An aiming instrument for a dirigible, vehicle mounted lamp comprising a support member having a seating surface adapted to engage an aiming surface on the lamp, means for securing the support member to the lamp for movement therewith, a first aiming element extending outwardly from the support member in a direction perpendicular to the seating surface and including an adjustably mounted level indicating device, a second aiming element extending in a direction parallel to the seating surface and supported adjacent the outermost end of the first aiming element, and means on one of said elements and on said support member to provide stable support of the instrument with seating surface perpendicular to a plane supporting surface whereby the level indicating device may be adjusted to a datum indication.

4. In combination with a dirigibly mounted lamp of the type including an aiming surface having a predetermined angular relation to the direction of the light beam projected from the lamp, a retaining member for securing the lamp in a dirigible mounting, a support member having a seating surface adapted to engage the aiming surface, means for securing the support member to the retaining member for movement with the lamp, a first aiming element extending outwardly from the support member in predetermined direction with respect to the seating surface, a level indicating device adjustably mounted on the first aiming element for establishing the desired aim in a vertical plane, and a second aiming element extending transversely of and rigidly supported by the first aiming element, said second aiming element extending in a predetermined direction with respect to the seating surface for establishing the desired aim in a horizontal plane.

5. In combination with a dirigibly mounted lamp of the type including an aiming surface in predetermined angular relation to the direction of the light beam projected from the lamp, a support member having a seating surface thereon adapted to engage the aiming surface, means for securing the support member to the lamp for movement therewith, a first aiming element on the support member extending outwardly therefrom at fixed predetermined angle with respect to the seating surface, a level indicating device on said element for indicating the desired aim of the light beam in a vertical plane, and a second aiming element mounted on and extending transversely of the first aiming element at a fixed predetermined angle with respect to the seating surface for indicating the desired aim of the light beam in a horizontal plane.

6. An aiming instrument for a dirigible, vehicle mounted lamp of the type including plural spaced aiming projections on the lens defining an aiming plane; said instrument comprising a support member including an annular seating surface, plural spring-urged plungers extending through the support member for securing the support member to the lamp with the seating surface in close engagement with the aiming projections, an arm mounted on the support member and extending perpendicularly outwardly from the seating surface, a spirit level adjustably mounted on the arm, a cross bar on said arm adjacent the outermost end and extending transversely thereof in a direction parallel to the seating surface, and a support portion on the support member and a support portion adjacent the outermost end of the arm, said support portions terminating in a plane perpendicular to the seating surface and adapted to provide stable support for the instrument when disposed upon a plane surface.

References Cited in the file of this patent

UNITED STATES PATENTS

| | | |
|---|---|---|
| 1,987,692 | Linendoll et al. | Jan. 15, 1935 |
| 2,557,893 | Russell et al. | June 19, 1951 |
| 2,609,611 | Dickson | Sept. 9, 1952 |

U. S. DEPARTMENT OF COMMERCE
PATENT OFFICE

CERTIFICATE OF CORRECTION

Patent No. 2,831,262     Robert N. Falge et al.     April 22, 1958

It is hereby certified that error appears in the printed specification of the above numbered patent requiring correction and that the said Letters Patent should read as corrected below.

Column 1, line 30, for "automobile" read -- automotive --; same line, for "Ho" read -- To --; column 3, line 19, for "consequently" read -- subsequently --; line 22, for "illustration" read -- illustrative line 36, for "incorporated" read -- incorporate --.

Signed and sealed this 10th day of June 1958.

(SEAL)

Attest:
KARL H. AXLINE
Attesting Officer

ROBERT C. WATSON
Commissioner of Patents